(12) United States Patent
Lai et al.

(10) Patent No.: US 6,192,093 B1
(45) Date of Patent: Feb. 20, 2001

(54) ENHANCED CIMT CODING SYSTEM AND METHOD WITH AUTOMATIC WORD ALIGNMENT FOR SIMPLEX OPERATION

(75) Inventors: Benny W H Lai, Frement; Tony Lin, La Mirada; Charles L. Wang, San Jose, all of CA (US)

(73) Assignee: Agilent Technologies, Palo Alto, CA (US)

( * ) Notice: Under 35 U.S.C. 154(b), the term of this patent shall be extended for 0 days.

(21) Appl. No.: 09/364,481

(22) Filed: Jul. 30, 1999

(51) Int. Cl.[7] .......................... H04L 25/36; H04L 25/40; H04L 7/00
(52) U.S. Cl. .......................... 375/371; 375/295; 375/316; 375/368
(58) Field of Search .................................... 375/316, 295, 375/293, 357, 359, 360, 368, 342, 365, 366, 371, 372

(56) References Cited

U.S. PATENT DOCUMENTS 3,760,277 * 9/1973 Whang ................................ 375/293

* cited by examiner

*Primary Examiner*—Chi H. Pham
*Assistant Examiner*—Phuong Phu
(74) *Attorney, Agent, or Firm*—James C. Pintner

(57) ABSTRACT

A method and system for receiving CIMT encoded data transmitted in simplex mode. The receiver (12) is adapted to receive a stream of digital data and analyze successive portions thereof to identify a predetermined pattern of data. The receiver (12) outputs the received digital data in response to a detection of the predetermined pattern of data and, in the alternative, outputs other data in response to a failure to detect the predetermined pattern of data. In the illustrative embodiment, the stream of digital data is transmitted as conditional invert master transition encoded simplex data. The receiver (12) includes a CIMT decoder (16) which analyzes the input data to identify a master transition therein. The receiver (12) uses a local clock to analyze successive portions of the received data stream and word alignment logic to identify a master transition therein. In the best mode, the inventive teachings are implemented in a communications system having a CIMT encoder (13) which transmits a time scrambled flag bit along with a stream of CIMT encoded data. The receiver (12) descrambles the flag bit and uses it to detect the master transition therein in the presence of static data.

36 Claims, 3 Drawing Sheets

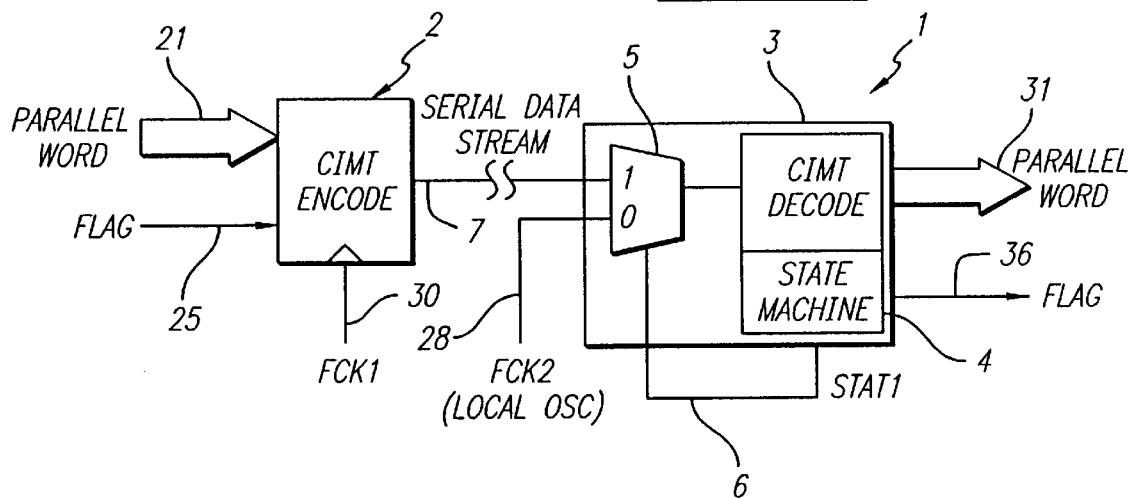
FIG. 1
PRIOR ART
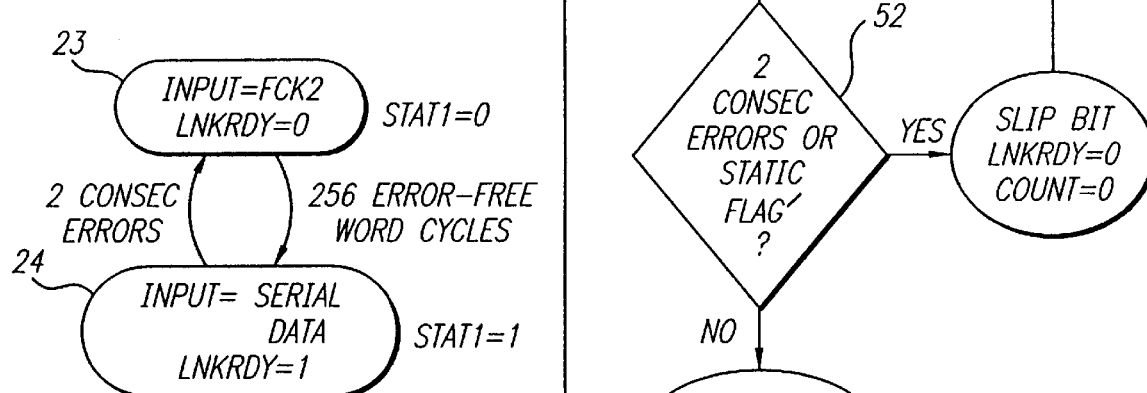
FIG. 2
PRIOR ART
FIG. 4

ENHANCED CIMT CODING SYSTEM AND METHOD WITH AUTOMATIC WORD ALIGNMENT FOR SIMPLEX OPERATION

BACKGROUND OF THE INVENTION

1. Field of the Invention

The present invention relates to data transmission systems and methods. More specifically, the present invention relates to systems and methods for encoding digital data at high speed to provide a balanced serial data stream that includes bit and frame synchronization control.

2. Description of the Related Art

The need to transmit large quantities of data rapidly from point to point led to the development of very high-speed communication links such as optical fibers and associated electro-optical components. In many such applications, it is necessary to serialize the data prior to transmission.

It is preferable, in the art, to encode a stream of data for transmission in such a manner that the data stream is balanced. "Balanced" means that over time the stream includes an equal number of logical one bits and logical zero bits. In electrical signal terms, a balanced data stream does not have a DC component whereas an unbalanced stream has a DC component.

Balanced data permits the use of AC-coupled circuits in the communication link. Many communication links do not perform satisfactorily, some do not perform at all, unless AC-coupled circuits can be used. For example, it may be necessary to use a transformer (an AC coupling device) to prevent ground loops and to reduce common mode signals. In addition, a laser element in a high-speed fiber optic transmitter requires a regulated drive current. If the laser carries balanced data, the average drive current is independent of the data and therefore is easier to regulate than would be the case if unbalanced data were transmitted. Also, it is easier to separate balanced data from DC bias currents in an optical receiver. Accordingly there was a need for a method of encoding digital data so that the resulting data stream is balanced before providing the data to a transmitter in a communication link.

Another need derives from the requirement that a receiver in a digital communication link be synchronized with an incoming digital signal so that it can extract frame and bit timing information from the signal. This timing information is then used to recover the actual data. Such synchronization may be accomplished, for example, by means of a phase-lock loop ("PLL") circuit such as that described in U.S. Pat. No. 4,926,447, the teachings of which are incorporated herein by reference.

It is also desirable to communicate various control signals to the receiver. These signals may convey additional information or they may be used to regulate the operation of the receiver itself.

A method of providing a balanced data stream is described in Carter, R. O., "Low-Disparity Binary Coding System," Electronic Letters, May 1965, Vol. 1, No. 3, pp 67–68. Briefly, groups of bits are inverted as needed to maintain a balance between the average number of logical one bits and logical zero bits carried by the communication link. An indicator bit is appended to each group to indicate whether that group is being transmitted in inverted form.

An improved version of this method, and apparatus for implementing it, are described in U.S. Pat. No. 5,022,051, the teachings of which are incorporated herein by reference. This patent also teaches appending a small plurality of M bits to each data word. These appended bits may be used, for example, to indicate whether the data bits have been inverted. In addition, the bits may carry a "master transition" which always occurs in the same relative position in each word. These bits are used by the receiver to establish synchronization with the incoming data stream.

A transition is defined by a change in the logic levels of two adjacent bits. The polarity of a transition is either positive-going, as in a change from a logical zero to a logical one, or negative-going.

Typically, it has been required that a master transition always have the same polarity. Two bits are required to define a master transition that always has the same polarity. The information content of a data stream could be increased by providing a master transition that could be of either polarity.

It was also desirable to provide a method of checking an incoming signal for errors. This has been done by transmitting additional bits, such as parity bits, that can be used by the receiver to determine whether the received signal contains any errors. However, these bits carry no primary information and using them results in some degradation of the maximum rate at which data can be transmitted.

Accordingly, there was a need for a way to encode data so as to provide a balanced data stream, that provided a high rate of data transfer, and that facilitated receiver synchronization and control and error checking.

The need in the art was addressed by U.S. Pat. No. 5,438,621, issued Aug. 1, 1995 to H. Thomas et al., and entitled DC-FREE LINE CODE AND BIT AND FRAME SYNCHRONIZATION FOR ARBITRARY DATA TRANSMISSION, (hereinafter the "Thomas" patent) the teachings of which are incorporated herein by reference. The Thomas patent provides a novel method of encoding digital data into a balanced data stream that affords a high rate of data transfer and that facilitates receiver synchronization and control and error checking with only a minimal reduction in the data rate. This coding scheme is also known as 'CIMT', (Conditional Invert Master Transition).

Briefly and in general terms, the CIMT method of encoding data according to the Thomas patent includes maintaining a cumulative polarity of bits which have previously been transmitted, forming a frame by combining a data word with a group of additional bits, using at least one of the additional bits to define a master transition in a fixed location in the frame, and setting the logical values of the combined bits such that the frame has a different polarity than the cumulative polarity.

As disclosed by Thomas et al., the "polarity" of a frame has one value (say, positive) if the frame contains more logical one bits than logical zero bits and a different value (negative) if the frame contains fewer logical one bits than logical zero bits. If the frame has equal numbers of logical one bits and logical zero bits, the polarity is considered to be neutral. Similarly, the cumulative polarity is positive if more logical one bits than logical zero bits have been transmitted, negative if fewer logical one bits than logical zero bits have been transmitted, and neutral if equal numbers of both kinds of bits have been transmitted.

In a preferred embodiment of the teachings of Thomas et al., a further bit was transmitted by encoding it into the additional bits as a "phantom" bit, often referred to as the flag bit. Thus, even though the further bit was not concatenated onto the bits to be transmitted, its logical value was carried by the additional bits and may be recovered by the receiver. This further bit may serve as another data bit to increase the data rate or it may be used for such other purposes as control or error checking, for example by varying its value from one frame to the next according to a predetermined error-checking pattern.

The frame polarity was set by Thomas opposite the cumulative polarity by inverting the logical values of the data bits and encoding the additional bits to indicate whether the logical values of the data bits have been inverted if the frame polarity would otherwise be the same as the cumulative polarity. If either the frame polarity or the cumulative polarity is neutral, the bits may be inverted or not as may be convenient.

In an alternative, if it was necessary to invert the logical values to maintain a balanced data stream, all the bits in the frame are inverted. In this case, the logical level of one of the additional bits could be used as an indicator of whether the bits have been inverted.

In another embodiment, the order of the bits is rearranged before transmission according to a predetermined pattern and reassembled after reception. An unauthorized receiver, not having the arrangement order, would not be able to reconstruct the data.

One or another of the bits adjacent the bits which define the master transition were preferably set to the same values as the bits which define the master transition from time to time as frames are transmitted so that the master transition is not always surrounded by other transitions. This tended to prevent the receiver from inadvertently staying locked onto a transition other than the master transition without detection of such an error.

Control words and fill words could be transmitted in addition to data words. A control word carries either information or control signals as desired. A fill word has only one transition in addition to the master transition and is used to establish synchronization and thereafter if necessary to maintain or reestablish synchronization. The fill words are balanced or are used in balanced pairs such that polarity need not be checked and the logical values of fill bits need not be inverted. The logical values of the additional bits indicate which type of word is being transmitted; in addition, a bit within a word, for example one or more bits in a control word, may be used to distinguish a control word from a fill word.

The master transition in the fill word typically was always of the same polarity. This facilitated synchronization of the receiver. After synchronization was attained, master transitions of either polarity were sufficient to maintain synchronization.

While Thomas et al. substantially addressed the need in the art for a way to encode data so as to provide a balanced data stream, that provided a high rate of data transfer, and that facilitated receiver synchronization and control and error checking, a need remains for further improvements in this area. Specifically, there has been a need to utilize the teachings of Thomas et al. in a simplex configuration, i.e., requiring no handshaking between the source and destination nodes. In a simplex configuration, it is difficult for a receiver constructed in accordance with the teachings of Thomas et al., to find the master transition, the point at which the cumulative polarity of the received signal changes from one state to the other.

Thus, a need remains in the art for a high-speed, reliable data transmission system and method using a CIMT coding scheme in a simplex configuration.

SUMMARY OF THE INVENTION

The need in the art is addressed by the data receiver of the present invention. Generally, the inventive receiver is adapted to receive a stream of digital data and analyze successive portions thereof to identify a predetermined pattern of data. The receiver outputs the received digital data in response to a detection of the predetermined pattern of data and, in the alternative, outputs other data in response to a failure to detect the predetermined pattern of data.

In the illustrative embodiment, the stream of digital data is transmitted as conditional invert master transition encoded simplex data. The receiver includes a CIMT decoder which analyzes the input data to identify the code field therein. The receiver uses a local clock to analyze successive portions of the received data stream and word alignment logic to identify the code field therein.

In the best mode, the inventive teachings are implemented in a communications system having a CIMT encoder which transmits a time scrambled flag bit along with a stream of CIMT encoded data. The receiver descrambles the flag bit and uses it to detect the code field therein in the presence of static data.

BRIEF DESCRIPTION OF THE DRAWINGS

FIG. 1 is a diagram illustrating use of the HDMP-1022/24 GLink chip set in simplex method m configuration in accordance with the prior art.

FIG. 2 is a state diagram which illustrates the operation of the state machine of FIG. 1.

FIG. 4 is a flow diagram of the operation of the word alignment logic of the receiver implemented in accordance with the teachings of the present invention.

DESCRIPTION OF THE INVENTION

Figure 3:
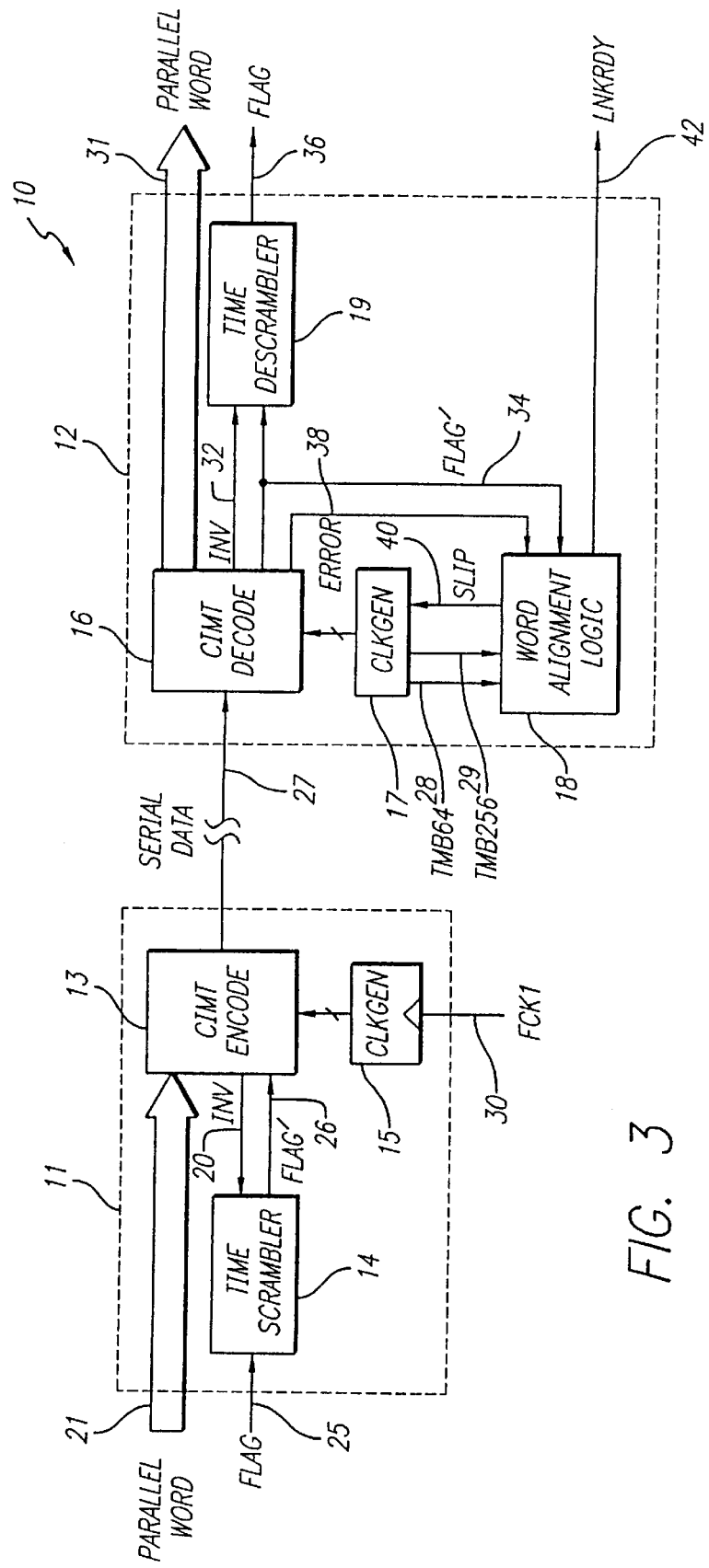
FIG. 3 is a block diagram of a communications system incorporating the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As mentioned above, there is a need to utilize the CIMT coding scheme disclosed in the above-referenced patent to Thomas et al., in a simplex configuration. Since the introduction of the GLink Chip Set, many customers have used the chips a simplex configuration, requiring no hand-shaking between the source and destination nodes. Since CIMT was not originally set up to efficiently work with a pure simplex operation, problems occasionally occurred, mainly with initial word alignment when static data is sent across the link. When the link eventually sent random data, the link would recover, and proper word alignment would be achieved.

The present invention is a method and system for CIMT data transmission and reception which safe-guards against word misalignment when static data is sent in a simplex configuration. In addition, as described more fully below, the present invention provides word alignment logic which eliminates the extra crystal oscillator required by prior teachings.

The data sheet of the GLink chip set (included below) describes the CIMT coding in full detail. The data field or "word field" is a field which could contain data, control or fill words. A frame is referred to as a 'word'.

In summary, the CIMT works as follows. The transmitter accepts a 16 or 20 bit wide word from the user, serializes it, and conditionally inverts this word to maintain DC balance. A 4-bit code is appended after this word field specifying if the word was inverted or not. In addition, a flag bit is encoded within the code field. The word field could either be designated as a data word, a control word, or a fill word. The receiver utilizes the fill words for frequency acquisition, and word alignment. Other unassigned states of the 4-bit code field are mapped as errors. The serialized data (for 16 bit mode) is shown below:

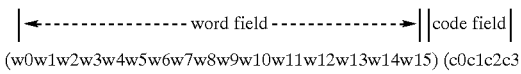

(w0w1w2w3w4w5w6w7w8w9w10w11w12w13w14w15) (c0c1c2c3)

Bits c1 and c2 are always opposite, providing a master transition.

A state machine in the receiver monitors the errors detected, and determines the status of the link. This system was intended as a full hand-shaking duplex link.

The present invention was developed to facilitate simplex communication with continuous data. As discussed more fully below, in a simplex configuration, the source Tx is continuously sending data or control words, without requiring to send any fill words. Thus, the receiver requires a local oscillator at the fill word rate as an alternate input, for frequency acquisition. The state machine output toggles between this local frequency, and the remote data stream upon 256 error-free cycles. When the active input becomes the remote data stream, the word alignment is random. The state machine thus has to rely solely on the error detection of the unassigned states to determined if the proper word boundary has been found. If 2 consecutive errors are detected, the state machine again selects the active input as the local clock. Because locking onto the local clock yields a error-free code-field, again the state machine toggles back to the remote data stream. The process is repeated until the word boundary is found. This requires that the local word rate clock must be slightly off from the remote clock to insure a walk off with the phase. This is best achieved with separate local crystal oscillator, at the same frequency as the word rate.

As discussed more fully below, the following problems were encountered with GLINK CIMT transmission in simplex mode in accordance with the present teachings.

1. Upon static code transmission, the state machine could be fooled into a false word boundary, since a static code could contain multiple nibbles of legal code-fields. The situation is improved with the aid of the flag bit toggling feature built into the CIMT code. When the user does not use the flag bit, the flag bit is set to alternate. The receiver looks for this alternation, and reports an error whenever the strict alternation is broken.

2. However, this method would prevent the user from using the flag bit. In addition, if the receiver word-locked onto a static word resembling a valid code-field, but did not detect an alternating flag bit, errors would be indicated every other word; 2 consecutive errors would not be observed and the state machine would not reset.

3. The flag-bit alternation would only apply to data words, but not control words nor fill words.

4. A separate crystal oscillator would be required, such that it would be slightly off in frequency, but not too much.

This meant that the user would have to add an additional component, and to provide a clock, which is slightly off from the system clock. This might result in frequency mixing, which could affect board performance.

As discussed more fully below, in the best mode, these additional concerns are addressed by time scrambling the flag bit. In accordance with the present teachings, the flag bit is scrambled at the transmitter, and descrambled at the receiver. Thus, a static flag bit at the input of the Tx would result in a new flag bit (call this flag'), which would be toggling over a sufficient time interval. The receiver's error detecting system is set up to detect this toggling over a minimum interval of 32 words, and request a new boundary to be searched, if a legal static code-field is encountered. The inventive method also allows the user to have control over the flag bit.

The randomness of the scrambling determines the likelihood of the toggling over a given interval, since it is possible, although remote, to unravel the scrambling. In the illustrative embodiment, the scrambling technique is chosen to be the XOR of the present flag bit, with the 2nd and 3rd previous scrambled flag bits, and with the previous invert bit. This invert bit adds an extra level of randomness, since the invert function is dependent on the randomness of the word field, as well as the history of bits sent.

The scrambling of the flag bit provides excellent protection in simplex transmission. However, the flag bit is only available in the data mode and with the prior CIMT coding scheme the flag bit is undefined when the word field is either a control word or fill word.

Another novel aspect of the present invention is that the following prior unused codes are now mapped into flag bits for control and fill words in the enhanced mode.

|  |  | w7 w8 (note 1) | c0 | c1 | c2 | c3 |
|---|---|---|---|---|---|---|
| Normal Cntl Word, | flag = 0 | 0 1 | 0 | 0 | 1 | 1 |
| Inverted Cntl Word, | flag = 0 | 1 0 | 1 | 1 | 0 | 0 |
| Normal Cntl Word, | flag = 1 | 0 1 | 0 | 1 | 0 | 1 |
| Inverted Cntl Word, | flag = 1 | 1 0 | 1 | 0 | 1 | 0 |
| Fill Word 1a, | flag = 0 | 1 1 | 0 | 0 | 1 | 1 |
| Fill Word 1b, | flag = 0 | 0 0 | 0 | 0 | 1 | 1 |
| Fill Word 1a, | flag = 1 | 1 1 | 0 | 1 | 0 | 1 |
| Fill Word 1b, | flag = 1 | 0 0 | 0 | 1 | 0 | 1 |

(Note 1):
For 16 bit operation, w7, w8 are used.
For 20 bit operation, w9, w10 are used.

This coding scheme fixes a potential (w14 w15 c0 c1) false-lock problem whereby with static data, the flag information might also be static. This also eliminates complications due to the shifting of data bits for control words.

In the best mode, (XOR) bit w0 is selectively inverted at the Tx with the previous scrambled flag bit. By the random nature of the scrambling, the master transition will be eliminated for 2 consecutive words, thereby causing a slip in the Rx bit lock logic. The w0 bit is then descrambled and de-inverted at the Rx.

This method of randomizing w0 at the Tx allows the Rx to easily decipher the original w0, since it also knows the previous flag and invert bits.

To address the problem of an external crystal for simplex operation as stated above, in the best mode, the present invention provides a novel word alignment system and method. This is implemented, in the illustrative embodiment below, with a state machine, which issues a slip request if proper word alignment has not been achieved, and a clock generator, which slips one bit on each slip request. This method insures a deliberate walk-off built into the word alignment process, thus requiring no external reference clock which is slightly off in frequency with the word rate clock.

The Rx clock generator processes a slip request signal from the word alignment state machine. Only one bit slip is allowed per request and the clock generator must then revert back to its normal operations. In effect, one clock cycle is masked out from the bit rate clock, causing a 1-bit slip in the word alignment relative to the bit rate clock. The slippage must occur before the beginning of the next word.

Illustrative embodiments and exemplary applications will now be described with reference to the accompanying drawings to disclose the advantageous teachings of the present invention.

FIG. 1 is a diagram illustrating use of the HDMP-1022/24 GLink chip set in simplex method III configuration in accordance with the prior art, The Tx (HDMP-1022) 2 takes in the parallel word 21, and flag bit (25), and performs CIMT encoding to form a serial data stream 7. The Rx (HDMP-1024) 3 decodes this serial data stream 7, to form the parallel word 31 and flag bit 36. The internal PLLs and clock and data recovery circuitries are not shown, but are described in great detail in the attached datasheets. In the simplex configuration, the Tx 2 is sending data words, and not fill words. For the Rx 3 to properly word align, a local clock fck2 (28) is used as an alternate input to the Rx 3. The input mux 5 is built into the Rx 3; its selection input (LOOPEN in the data sheet) is connected to the output STAT1 of the state machine 4.

FIG. 2 is a state diagram that illustrates the operation of the state machine of FIG. 1. In State 1 (24), the multiplexer 5 is switched to the serial data 7, with an arbitrary word alignment. If the detected code-field is not the true code-field, then random data should cause the state machine to detect errors. Upon two consecutive errors, the state machine changes to State 0 (23), which forces the input to be switched from the serial data stream 7 to the local clock fck2 28. This local clock fck2 28 is set up to be at the same center frequency as fck1 30; since they are not synchronous, there is a phase walk-off between the two phases. When the input is switched to fck2 28, the internal PLL locks onto the master transition emulated by the rising edge of fck2, and the state machine 4 is reset to State 1 (24) after 256 error-free cycles, which switches the input back to serial data 7, a new arbitrary word alignment is obtained. This process is repeated until the true control field is finally detected.

This method of word synchronization in the simplex mode depends on the assumption that data sent in the word field, would eventually cause two consecutive errors to trigger the state machine. However, if the data in the word field are static, that assumption is no longer true, as these static bits could emulate legal code-field values, and thus will not be detected as errors. Also, the alignment process relies on the phase walk-off of a local clock fck2, which needs to be not synchronous to fck1, but yet not too far off in frequency. This requirement made this clock hard to quantify. The presence of this slightly off fck1 clock may cause frequency mixing which is undesirable in board designs and layout.

FIG. 3 is a block diagram of a communications system incorporating the teachings of the present invention. The system 10 includes a transmitter 11 and one or more receiver (s) 12. The transmitter 11 includes a CIMT encoder 13 which receives parallel input data on bus 21 and a scrambled flag (flag') on line 26. The scrambled flag is provided by a time scrambling circuit 14, which, is disclosed more fully below, receives a flag bit on line 25 and an invert signal 'inv' from the encoder 13 on line 20. A clock generator circuit 15 receives clock input 'fck1' on line 30 and outputs clock signals to the encoder 13.

In the best mode, the CIMT encoder 13 is implemented in accordance with the teachings of the above-referenced Thomas patent, the teachings of which have been incorporated herein by reference. See also a data sheet entitled Low Cost Gigabit Rate Transmit/Receive Chip Set with TTL I/Os provided by the present assignee, Hewlett Packard, and incorporated herewith. This data sheet discloses useful information with respect to the use of an HDMP-1022 transmitter and HDMP-1024 receiver, both of which incorporate the present teachings.

In the illustrative embodiment, the transmitter sends CIMT serial data over a channel or link 27 to the receiver 12. Those skilled in the art will appreciate that the data may be transmitted in duplex or simplex mode. However, inasmuch as the invention is adapted to resolve problems in the prior art associated with CIMT transmission of simplex mode data, the illustrative embodiment will be described herein in the context of simplex mode data transmission.

The receiver 12 includes a CIMT decoder 16 implemented in accordance with the teachings of Thomas et al., which, as mentioned above, have been incorporated herein by reference, and the data sheet incorporated herein. The decoder 16 receives clock inputs from a clock generator circuit 17. The clock generator circuit 17 is driven by word alignment logic 18. As discussed more fully below, and in accordance with the present teachings, the word alignment logic 18 causes the decoder 16 to analyze successive portions of the received serialized digital data stream to lock onto a valid code field. When the decoder 16 locks onto the received serialized data, it outputs CIMT decoded parallel data 31. Decoding requires selective bit inversion. The 'invert' signal generated for this purpose is input to a time scrambling circuit 19 (on line 32) along with the received scrambled flag signal flag' on line 34. As disclosed more fully below, the time descrambler 19 outputs the descrambled flag signal on line 36.

When word synchronization on the received data stream is lost, random data may cause the CIMT decoder to output an error signal to the word alignment logic 18 on line 38. Upon two consecutive errors, the word alignment logic 18 outputs a slip signal to the clock generator circuit 17 on line 40. The slip signal causes the decoder 16 to examine the next adjacent portion of the received data of width equal to the previously examined portion offset by one or more bits.

The word alignment logic 18 takes as inputs, the error 38 and flag' 34 outputs of the code-field decoder, and time-base pulses tmb64, tmb256 which are long repetitive pulse divided down by the clock generator block. Tmb64 (28) is the word rate reference clock divided by 64, and tmb256 (29) is divided down by 256. With enhanced simplex mode engaged, the scrambled flag bit is also checked for toggling within the tmb64 pulse. The tmb64 pulse acts as an inspector, such that during the inspection time of 32 word long, it must find at least one transition in the scrambled flag bit. When the flag toggling fails, then a slip request is also issued to the clock generator.

The tmb256 inspection pulse checks for a lack of slip requests over a time span of 128 continuous words. When this occurs, then the correct word alignment is achieved, and a link ready (LNKRDY) output is issued. The flag inspection pulse, tmb64 totally lies within the link ready inspection pulse, tmb256, such that link ready cannot go high during a flag toggling inspection.

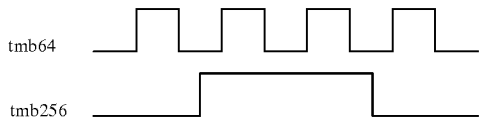

The word alignment logic 18 may be implemented in combinational logic or in software with a microprocessor.

FIG. 4 is a flow diagram of the operation of the word alignment logic of the receiver implemented in accordance with the teachings of the present invention. In step 52, the system checks for two consecutive errors or a descrambled static flag' bit. If either of these conditions is 'true', then at step 54, the system generates a slip bit and returns to step 52 as discussed above.

If neither of these conditions is true, then at step 56, the 'error free' count is incremented and, at step 58, this count is compared to a threshold (e.g., 128). If the error free count threshold is not exceeded, the system loops back to step 52, otherwise, at step 60, the link ready signal is set high.

In the event that a static data word is transmitted, the decoder 16 may misinterpret the static data as a valid code-field. To address this potential problem, in accordance with the present teachings, the flag is scrambled in the transmitter 11 and descrambled in the receiver 12.

Figure 5:
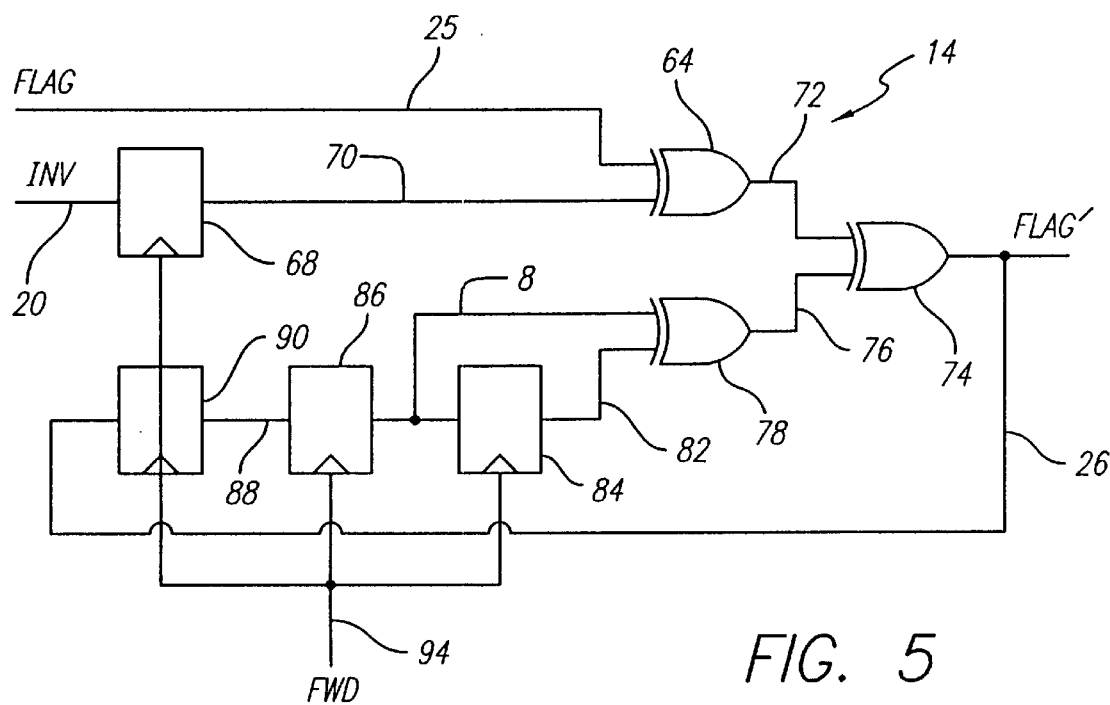
FIG. 5 is a schematic diagram of the flag scrambler 14 utilized in the data transmitter of the present invention.
Figure 6:
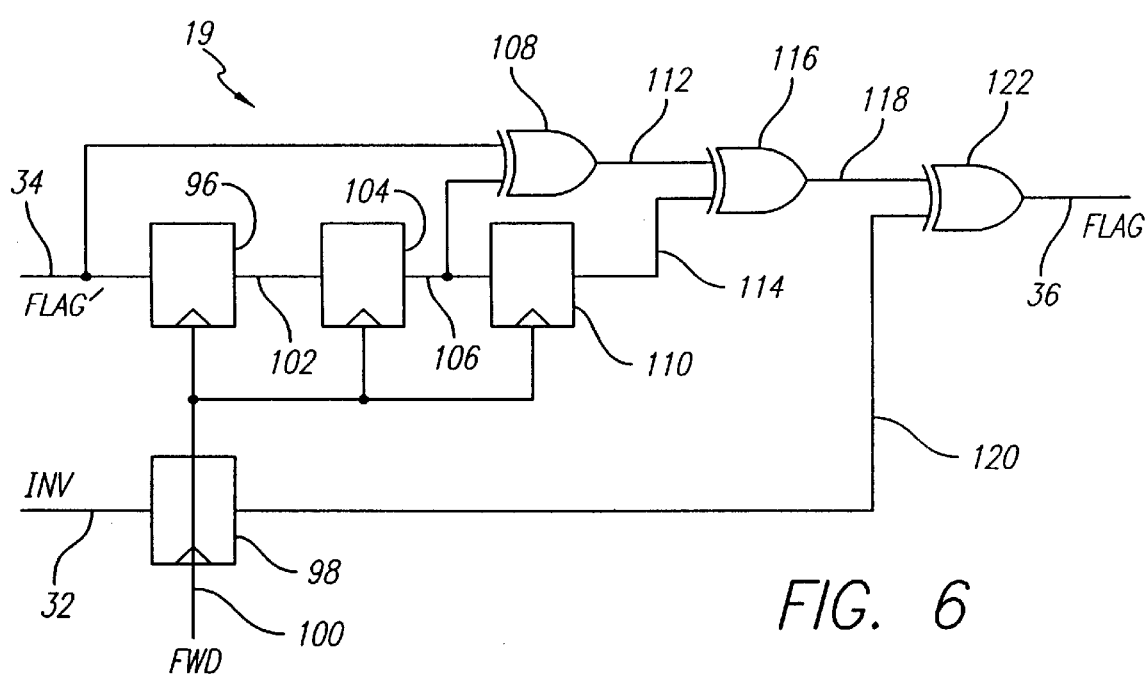
FIG. 6 is a schematic diagram of the time descrambler 19 utilized in the data receiver of the present invention.

FIG. 5 is a schematic diagram of the flag scrambler 14 utilized in the data transmitter of the present invention. The flag signal is received on line 25 and scrambled in accordance with a polynomial. In the illustrative embodiment, the flag signal is time scrambled with the following polynomial:

$$\text{flag}'(n) = \text{inv}(n-1) \text{ XOR flag}(n) \text{ XOR flag}'(n-2) \text{ XOR flag}'(n-3) \quad [1]$$

and is implemented by the scrambling circuit with a number of D flip-flops 68, 84, 86 and 90 and exclusive OR (XOR) gates 64, 74 and 78. In FIGS. 5 and 6, 'fwd' is the word rate clock.

FIG. 6 is a schematic diagram of the time descrambler 19 utilized in the data receiver of the present invention. The descrambler is designed to implement the polynomial utilized by the scrambler 14, as described by the following polynomial:

$$\text{flag}(n) = \text{inv}(n-1) \text{ XOR flag}'(n) \text{ XOR flag}(n-2) \text{ XOR flag}(n-3) \quad [2]$$

Accordingly, the descrambler 19 includes a plurality of D flip-flops 96, 98, 104 and 110 and a number of XOR gates 108, 116, and 122.

Those skilled in the art will appreciate that the teachings of the present invention are not limited to a particular scrambling and descrambling algorithm. Any suitable algorithm may be implemented in accordance with the requirements of a particular application.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A data receiver comprising:
   first means for receiving a stream of digital data;
   second means for analyzing successive portions of said stream of digital data to identify a predetermined pattern of data, the second means for analyzing including (i) means for checking for proper word alignment, (ii) means, operative if proper word alignment is not found, for performing a bit slip to slip word alignment relative to a bit rate clock, and (ii) means for repeating operation of the means (i) and (ii) until proper word alignment is found; and
   third means for providing said received digital data to said second means in accordance with in a first state in response to a detection of said predetermined pattern of data in said received digital data by said second means and for providing other data to said second means in accordance with a second state in response to a failure of said second means to detect said predetermined pattern of data in said received digital data.

2. The data receiver of claim 1 wherein said stream of digital data is transmitted as simplex data.

3. The data receiver of claim 1 wherein said predetermined pattern is a master transition.

4. The data receiver of claim 1 wherein said second means is a decoder.

5. The data receiver of claim 4 wherein said second means is a conditional invert master transition (CIMT) decoder.

6. The data receiver of claim 5 wherein said digital data is transmitted by a conditional invert master transition (CIMT) encoder.

7. The data receiver of claim 6 wherein said CIMT encoder includes means for transmitting a flag bit.

8. The data receiver of claim 7 wherein:
   said CIMT encoder includes means for scrambling said flag bit to provide a scrambled flag bit: and
   said receiver includes means for receiving and descrambling said scrambled flag bit to provide a descrambled flag bit.

9. The data receiver of claim 8 wherein said third means further includes means:
   (a) for providing said received digital data to said second means in accordance with in a first state in response to a detection of a predetermined pattern of data in said scrambled flag bit, and
   (b) for providing other data to said second means in accordance with a second state in response to a failure of said second means to detect said predetermined pattern of data in said scrambled flag bit.

10. The data receiver of claim 9 wherein said third means further includes means:
    (a) for providing said received digital data to said second means in accordance with in a first state in response to (i) a detection of said predetermined pattern of data in said received digital data or (ii) a detection of a dynamic flag bit; and
    (b) for providing other data to said second means in accordance with a second state in response to (i) a failure of said second means to detect said predetermined pattern of data in said received digital data or (ii) a detection of a static flag bit.

11. The data receiver of claim 10 wherein said flag bit is time scrambled.

12. The data receiver of claim 6 wherein said CIMT encoder is a parallel-to-serial encoder.

13. The data receiver of claim 12 wherein said second means is a serial-to-parallel decoder.

14. The data receiver of claim 1 wherein said third means is a word alignment logic.

15. The data receiver of claim 1 wherein said third means is a state machine.

16. The data receiver of claim 15 wherein said first means is a multiplexer adapted to receive said digital data as a first input thereto.

17. The data receiver of claim 16 wherein said other data is provided as a second input to said multiplexer by a local clock generator.

18. The data receiver of claim 16 wherein said state machine includes means for commanding said multiplexer:
   (a) to output said received digital data to said second means in said first state, and
   (b) to output said other data to said second means in said second state.

19. The data receiver of claim 1, wherein the means for performing a bit slip includes means for slipping by one bit responsive to a slip request.

20. A data transmission system comprising:
   a conditional invert master transition (CIMT) encoder for encoding a digital data input signal to a balanced stream of digital data and transmitting said data over a communications link in a simplex mode of transmission;
   multiplexer means for (a) receiving said stream of CIMT encoded digital data and data from a local source, and (b) providing an intermediate output signal in response thereto;
   a CIMT decoder for analyzing a first portion of said intermediate output signal to identify predetermined pattern of data, the CIMT decoder including (i) means for checking for proper word alignment, (ii) means, operative if proper word alignment is not found, for performing a bit slip to slip word alignment relative to a bit rate clock, and (ii) means for repeating operation of the means (i) and (ii) until proper word alignment is found; and
   a state machine:
   (a) for commanding said multiplexer to output said received digital data to said decoder in accordance with in a first state in response to a detection of said predetermined pattern of data in said received digital data by said CIMT decoder; and
   (b) for commanding said multiplexer to output other data to said CIMT decoder in accordance with a second state in response to a failure of said CIMT decoder to detect said predetermined pattern of data in said received digital data.

21. The data transmission system of claim 20 wherein said other data is provided as a second input to said multiplexer by a decoder clock.

22. The data transmission system of claim 21 wherein said CIMT encoder is driven by an encoder clock.

23. The data transmission system of claim 22 wherein the relative frequencies of said encoder clock and said decoder clock are substantially equal.

24. The data transmission system of claim 22 wherein the relative phases of said encoder clock and said decoder clock are no more than substantially equal.

25. The data transmission system of claim 20, wherein the means for performing a bit slip includes means for slipping by one bit responsive to a slip request.

26. A data transmission system comprising:
   a transmitter having a conditional invert master transition (CIMT) encoder for encoding a digital data input signal to a balanced stream of digital data and transmitting said data over a communications link in a simplex mode of transmission, said CIMT encoder including means for scrambling a flag bit to provide a scrambled flag bit; and
   a receiver having:
      multiplexer means for receiving said stream of conditional invert master transition encoded digital data and data from a local source and providing an intermediate output signal in response thereto;
      a CIMT decoder for analyzing a first portion of said intermediate output signal to identify predetermined pattern of data, the CIMT decoder including (i) means for checking for proper word alignment, (ii) means, operative if proper word alignment is not found, for performing a bit slip to slip word alignment relative to a bit rate clock, and (ii) means for repeating operation of the means (i) and (ii) until proper word alignment is found;
      means for receiving and descrambling said scrambled flag bit to provide a descrambled flag bit; and
      a state machine:
      (a) for commanding said multiplexer to output said received digital data to said decoder in accordance with in a first state in response to a detection of said predetermined pattern of data in said received digital data by said CIMT decoder, and
      (b) for commanding said multiplexer to provide output other data to said CIMT decoder in accordance with a second state in response to (i) a failure of said CIMT decoder to detect said predetermined pattern of data in said received digital data, or (ii) detection of a static descrambled flag bit.

27. The data transmission system of claim 26, wherein the means for performing a bit slip includes means for slipping by one bit responsive to a slip request.

28. A data reception method comprising the steps of:
   receiving a stream of digital data;
   analyzing successive portions of said data to identify a predetermined pattern of data, the step of analyzing including (i) checking for proper word alignment, (ii) if proper word alignment is not found, performing a bit slip to slip word alignment relative to a bit rate clock, and (ii) repeating steps (i) and (ii) until proper word alignment is found; and
   outputting said received digital data in response to a detection of said predetermined pattern of data in said received digital data and for outputting other data in response to a failure to detect said predetermined pattern of data in said received digital data.

29. The data reception method of claim 28 wherein said stream of digital data is transmitted as simplex data.

30. The data reception method of claim 29 wherein said predetermined pattern is a master transition.

31. The data reception method of claim 30 wherein said digital data is conditional invert master transition (CIMT) encoded.

32. The data reception method of claim 31 wherein said digital data includes a flag bit.

33. The data reception method of claim 32 wherein said flag bit is scrambled.

34. The data reception method of claim 33 further including the step of descrambling said flag bit to provide a descrambled flag bit.

35. The data reception method of claim 34 further including the steps of:
   outputting said received digital data in response to a detection of said predetermined pattern of data in said received digital data or a detection of a dynamic flag bit; and
   outputting said other data in response to a failure to detect said predetermined pattern of data in said received digital data or a detection of a static flag bit.

36. The data reception method of claim 28, wherein the step of performing a bit slip includes slipping by one bit responsive to a slip request.

* * * * *